United States Patent [19]

Bergmann

[11] 4,290,402

[45] Sep. 22, 1981

[54] GAS-OPERATED INTERNAL COMBUSTION ENGINE

[75] Inventor: Horst Bergmann, Esslingen, Fed. Rep. of Germany

[73] Assignee: Daimler-Benz Aktiengesellschaft, Stuttgart, Fed. Rep. of Germany

[21] Appl. No.: 138,094

[22] Filed: Apr. 7, 1980

[30] Foreign Application Priority Data

Apr. 6, 1979 [DE] Fed. Rep. of Germany ....... 2913864

[51] Int. Cl.$^3$ ............................................. F02M 13/08
[52] U.S. Cl. ............................ 123/527; 123/DIG. 11
[58] Field of Search ................... 123/27 GE, 527, 529

[56] References Cited

U.S. PATENT DOCUMENTS

| 3,540,419 | 10/1968 | Foy | 123/527 |
|---|---|---|---|
| 3,982,516 | 9/1976 | Abernathy | 123/27 GE |
| 4,040,403 | 8/1977 | Rose | 123/527 |
| 4,063,905 | 12/1977 | Johnson | 123/527 |

*Primary Examiner*—Ronald B. Cox
*Attorney, Agent, or Firm*—Craig and Antonelli

[57] ABSTRACT

A gas-operated internal combustion engine which includes an air/gas mixer and a volume control valve for feeding gas to the air/gas mixer. The volume control valve is normally biased into a closed position and includes a diaphragm adapted to be exposed on an operating side thereof to a vacuum ambient in the gas downstream of the volume control valve so as to urge the diaphragm to opening position of the volume control valve. A rear side of the diaphragm is adapted to be exposed to a control pressure. A pressure compensating connection is provided between the rear side of the diaphragm and a portion of the air supply system of the engine and terminates at or upstream of the air/gas mixer. A choke is arranged in the pressure compensating connection at either an air filter of the air supply system or a housing of the air/gas mixer with a check valve being disposed in the pressure compensating connection at a position between the choke and the volume control valve. A branch conduit branches off the pressure compensating connection at a position between the check valve and the volume control valve with a reversing valve being arranged in the branch conduit for selectively controlling the communication of the branch conduit with either the atmosphere or with the air/gas mixer.

10 Claims, 4 Drawing Figures

GAS-OPERATED INTERNAL COMBUSTION ENGINE

The present invention relates to an internal combustion engine and, more particularly, to a gas-operated internal combustion engine which includes a volume control valve for feeding of gas to an air/gas mixer wherein a valve, controlling the gas stream and being biased into a closing direction by a spring force, is adjustable by a diaphragm which is exposable to a vacuum ambient in the gas downstream of the volume control valve along the lines of the opening direction from the operating side, with a rear side of the diaphragm being exposable to a control pressure, and with an air filter, provided within a charging supply system to the operating cylinders of the internal combustion engine, being provided downstream of the air/gas mixer.

Gas-operated internal combustion engines, especially for automotive vehicles, are deficient in several respects with regard to engine parameters and safety such as, for example, a dieseling of the internal combustion engine upon a shut-off thereof, a backfiring during a coasting operation of the vehicle, and over speeding or over taching of the internal combustion engine beyond a permissible maximum rotational speed, and a gap or hesitation which is encountered during acceleration of the vehicle when depressing the accelerator or gas pedal, as well as the irregular operation of the internal combustion engine and other undesirable manifestations.

The aim underlying the present invention essentially resides in providing an arrangement which adapts a gas-operated internal combustion engine functionally to the requirements for the driving of automotive vehicles by improving the gas system and/or the control thereof.

In accordance with advantageous features of the present invention, a gas-operated internal combustion engine is provided wherein a pressure compensating connection or conduit as arranged between a rear side of a diaphragm of the volume control valve and a portion of the charging air supply system of the engine. The pressure compensating connection or conduit is connected to the air supply system at or upstream of the air/gas mixer. The air supply system includes an air filter and a choke means as arranged in the pressure compensating connection or conduit at the air filter or at a housing of the air/gas mixer. A check valve is also disposed in the pressure compensating connection or conduit and is biased in a blocking mode toward the volume control valve. A branch conduit branches off the pressure compensating connection or conduit at a position between the check valve and the volume control valve with a reversing valve being arranged in the branch conduit and being operable to selectively switch the branch conduit, through a choke, into the atmosphere or, without impediment, to the vacuum ambient in the air/gas mixer.

Due to their normal functioning, commercially available gas mixers react to changes in the intake pressure in such a manner that a mixer enrichment and thus an increase in power takes place with increasing vacuum values. This problem arises by virtue of the general utilization of air filters with a paper filter insert. However, the intake vacuum values approximately double from the clean condition of an air filter to the dirty condition thereof. In accordance with the present invention, the above noted mixture enrichment is compensated for with a corresponding mixture thinning by exposing a rear side of the volume control valve to a control pressure dependent upon the intake vacuum, and an ensuing power surge by a feed of a richer air/gas mixture with an increasing contamination of the air filters is avoided by virtue of the provision of the check valve, biased with a corresponding opening resistance, so that the effects of the compensation of the air/gas mixture only occurs in case of an onsetting contamination of the filter.

To avoid a dieseling of the gas-operated internal combustion engine, epecially after a vigorous driving operation and in situations wherein gaseous mixtures having a high butane proportion are used, in accordance with further features of the present invention, the reversing valve may be electromagnetically operated, with an electromagnet of the reversing valve being operatively connected in parallel with an ignition switch so that, when the ignition switch is turned on, the electromagnet is energized and the reversing valve is displaced into a position whereby the branch conduit is in communication with the atmosphere and, when the electromagnet is de-energized, the reversing valve is displaced into a position wherein the branch conduit is connected to the air/gas mixer. By constructing the reversing valve as a 3/2-way solenoid valve, when the ignition switch is turned off, a rear side of a diaphragm of the volume control valve is exposed to a high vacuum and a further feed of gas is completely interrupted along the shortest path.

It is also possible in accordance with the present invention to at least indirectly determine a position of a throttle valve of the internal combustion engine by a position scanner, with the position scanner being adapted to determine the closed position of the throttle valve and produce an electrical output signal indicative of such positioning. Moreover, it is also possible to arrange a revolution counter at the internal combustion engine to sense the rotational speed of the engine and transmit an output signal indicative of the sensed rotational speed. The revolution counter may be operatively connected to, for example, the operating or crank shaft of the internal combustion engine so as to sense the rotational speed of such shaft. A normally closed switch may be arranged in a current lead between the electromagnet of the reversing valve and the ignition switch with the normally closed switch being operable by way of a logic circuit, controllable by the output signals of the position scanner and the revolution counter, to open the normally closed switch when the throttle valve is in the closed position and/or when the rotational speed of the internal combustion engine rises beyond a predetermined idling speed. By virtue of such an arrangement, irregular ignitions which occur due to the quantity of idling gas are avoided during a coasting operation, that is, when the internal combustion engine is driven by way of the vehicle with the throttle valve being in an idling position.

Irregular ignitions of an internal combustion engine cause a corresponding noise pattern, i.e., backfiring. In accordance with additional advantageous features of the present invention, the switching circuit for the reversing valve constructed as a 3/2-way solenoid valve may be provided with an additional switch which is adapted to be opened as soon as the above noted two criteria are met, namely, the throttle valve is in a closed position and the rotational speed of the internal combustion engine is above the predetermined idling speed.

The logic circuit will then block the gas feed at the volume control valve when the switch is open which may be accomplished, for example, by way of a microswitch disposed at the throttle valve in conjunction with the revolution counter or engine speed transmitter. In city traffic with frequent start and stop operations of a vehicle, a positive effect may thereby also be obtained on the fuel consumption of the engine. Moreover, the logic circuit may be constructed so that the switch is also turned off when the throttle valve is in an open position and the maximum permissable rotational speed of the engine has been exceeded.

In a normal driving operation of a motor vehicle, the speed of the internal combustion engine is restricted or controlled by way of a "soft"-controlling mechanical maximum speed governor. In this situation, such controller is impared in its function or even fails altogether, an additional overspeed protection for the internal combustion engine must become effective because, due to the relatively low nominal speeds, an automatic control of the engine due to a lack of charging air does not occur. It is of course also possible to interrupt ignition by way of a centrifugal switch provided in the distributor finger or rotor; however, such a proposal has a disadvantage that, in case of an interruption of ignition, ignitable mixture enters the exhaust pipe of the engine whereby uncontrollable combustion or explosions may occur.

In accordance with the present invention, the normally closed switch is opened by an opening of the 3/2-way valve switching circuit when a permissable maximum speed has been exceeded, in conjunction with the logic circuit, and a feeding of gas to the internal combustion engine is blocked or interrupted.

In accordance with the present invention, an opening pressure of the check valve is selected so that the air/gas mixture is influenced by way of the volume control valve only when the air filter of the air supply system has become dirty, but so that a basic load with a correspondingly larger primary gas choke is not produced. Consequently, the internal combustion engine of the present invention, may be operated with a minimum primary gas choke and thus manipulations at the gas system with respect to the output of the engine are extensively ineffective. Additionally, it is advantageous to operate with a maximally lean mixture in the partial load range of operation of the internal combustion engine in order to maintain the emission of deleterious compounds such as the hydrocarbons, nitrous oxide, and carbon dioxide, at a small value and to make it possible to maintain a low specific fuel consumption with a lowering of the exhaust gas temperature.

In accordance with the present invention, an acceleration pump may be coupled with a throttle valve or an operating linkage thereof with the acceleration pump including a delivery conduit or nipple terminating in the pressure-compensating connection. The acceleration pump is provided with an intake valve and a delivery valve and the delivery conduit terminates in the pressure-compensating connection at a point between the check valve and the volume control valve.

By virtue of the provision of the acceleration pump, an air surge into the control conduit to the volume control valve is produced during a depressing of a gas pedal or accelerator whereby a rapid release of gas is enforced. The effect produced is stronger, the faster the accelerator is operated, since a throttled blow-off or release possibility exists by way of the atmospheric connection of the reversing valve.

Accordingly, it is an object of the present invention to provide a gas-operated internal combustion engine which avoids, by simple means, shortcomings and disadvantages encountered in the prior art.

Another object of the present invention resides in providing a gas-operated internal combustion engine which minimizes if not avoids the dieseling of the engine upon a shut-off thereof.

A further object of the present invention resides in providing an internal combustion engine which minimizes if not avoids the occurrance of a backfiring during a coasting operation of a vehicle in which the engine is disposed.

Yet another object of the present invention resides in providing a gas-operated internal combustion engine which prevents an overspeeding of the engine beyond a permissable maximum rotational speed.

Another object of the present invention resides in providing a gas-operated internal combustion engine which eliminates a pausing or hesitation during an acceleration of the engine occasioned by a depressing of the accelerator.

A still further object of the present invention resides in providing a gas-operated internal combustion engine which functions reliability under all operating conditions.

Another object of the present invention resides in providing an internal combustion engine which compensates for the contamination of a filter provided in the air supply system of the engine.

Another object of the present invention resides in providing a gas-operated internal combustion engine the operation of which is controlled by the positioning of a throttle valve thereof and/or the rotational speed of the engine.

These and other objects, features, and advantages of the present invention will become more apparent from the following description when taken in connection with the accompanying drawings which show, for the purposes of illustration only, one embodiment in accordance with the present invention, and wherein.

Figure 1:
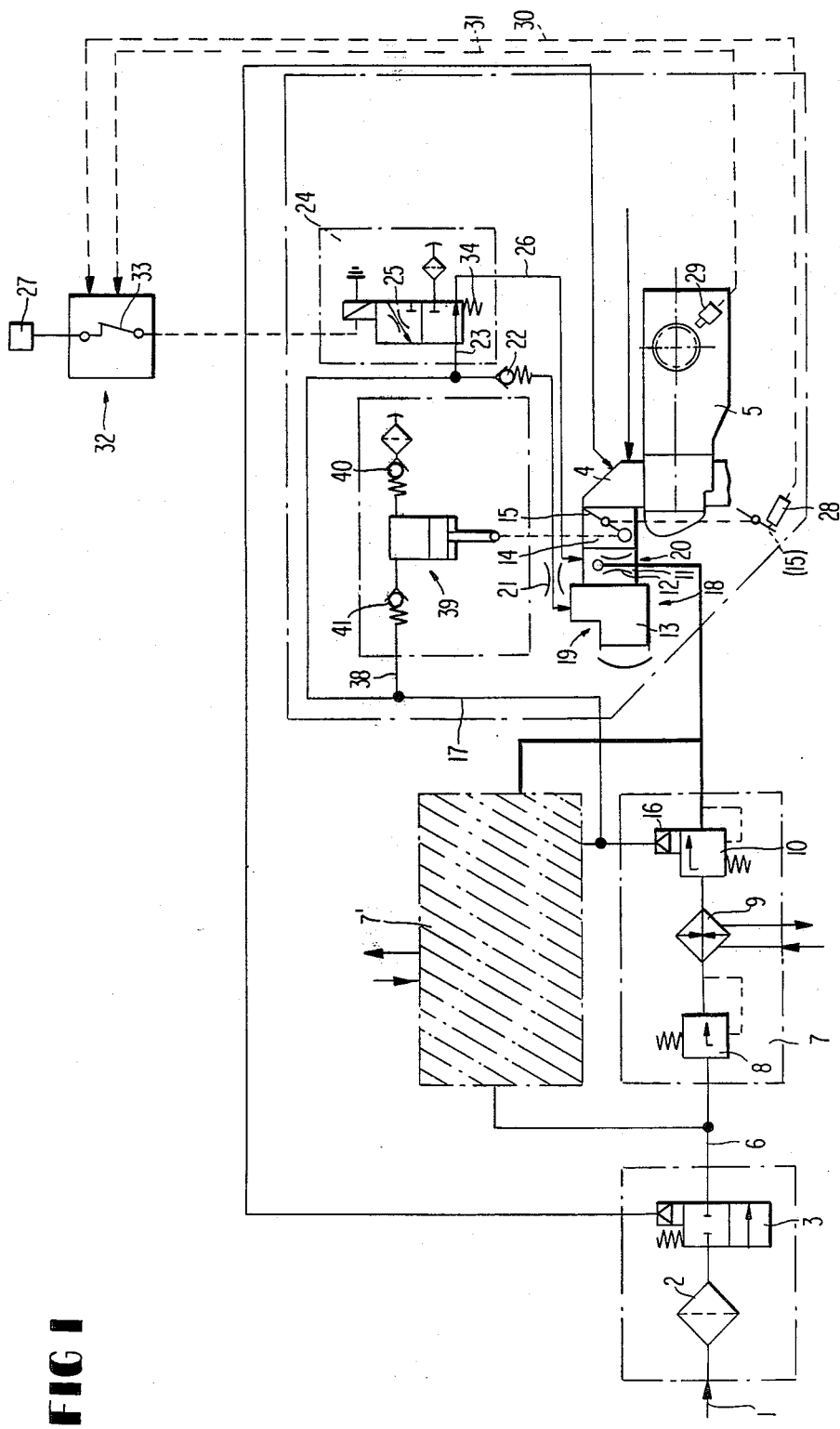
FIG. 1 is a highly schematic view of a gas-operated internal combustion engine in accordance with the present invention.

Referring now to the drawings wherein like reference numerals are used throughout the various views to designate like parts and, more particularly, to FIG. 1, according to this figure, a liquid gas passes from a gas tank (not shown) through a main valve generally designated by the reference numeral 1 which includes a filter insert 2 and a 2/2-way vacuum valve 3. The vacuum valve 3 is exposed to a vacuum of an intake manifold 4 of an internal combustion engine 5 by way of, for example, a conduit 4' such that, when the internal combustion engine 5 is in operation, the vacuum valve 3 is positioned so as to enable a flow of the liquid gas through the vacuum valve 3 with the liquid gas passing from an outlet of the vacuum valve 3 through a conduit 6 to a converter generally designated by the reference numeral 7, wherein the liquid gas is converted into a gaseous state. Generally, one converter is sufficient for operation of the internal combustion engine 5; however, in extreme cases such as, for example, operation of the internal combustion engine 5 at temperatures below −20° C., an additional converter 7', connected in parallel with the converter 7, will be necessary.

The converter 7 includes a pressure-reducing valve 8, a vaporizer 9, and a vacuum-controlled volume control valve 10. The vaporizer 9 is connected to, for example, a radiator associated with the internal combustion engine 5, so as to enable coolant therefrom to flow through the vaporizer 9. A conduit 10' extends from the volume control valve 10 to a gas mixer generally designated by the reference numeral 11 in which is arranged in predetermined fixed choke 12 which is dependent upon the desired output power or performance of the internal combustion engine 5. The air/gas mixer 11 is connected to an air supply unit generally designated by the reference numeral 18 and to a connecting piece of choke nipple 14. The charging air supply unit 18 includes an air filtering arrangement generally designated by the reference numeral 19 having an air filter insert 13. The connecting piece 14 is in communication with the intake manifold 4 of the internal combustion engine and has disposed therein a throttle valve 15.

Figure 2:
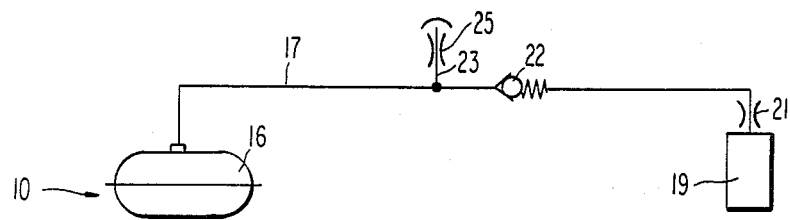
FIG. 2 is a schematic fragmentary view of the internal combustion engine of FIG. 1 illustrating a control arrangement for compensation of contamination of an air filter of the air supply system of the engine.

The volume control valve 10 is provided with a pressure transmitting element such as, for example, a diaphragm (not shown), one side of which is adapted to be exposed to a control pressure dependent upon the intake vacuum of the air supply unit 18. More particularly, as shown in FIG. 2, a pressure compensating connection or conduit 17 is provided on a rear side 16 of the volume control valve 10. The pressure compensating connection 17 connects the volume control valve 10 to the air supply unit 18 at, or upstream of the air/gas mixer 11.

To compensate for contamination of the air filtering arrangement 19 and/or a blockage of the supply of gas, starting at the air filter arrangement 19 or at a housing 20 of the air/gas mixer 11, a choke 21 is provided with a check valve 22 being disposed in the pressure compensating connection 17 between the volume control valve 10 and the air filter arrangement 19. The check valve 22 is normally biased into a blocking mode in a direction toward the volume control valve 10. A branch conduit 23 branches off between the check valve 22 and volume control valve 10 and a reversing valve 24 is arranged in the branch conduit 23. The reversing valve 24 is operable to be selectively switched so that the branch conduit 23 is vented or opened to the atmosphere through a choke 25 or the branch conduit 23 is subjected to the action of the vacuum ambient in the air/gas mixer 11.

The reversing valve 24 is constructed as an electromagnetically operable 3/2-way valve which is functionally connected in parallel with an ignition switch 27 in such a manner that, when the ignition is turned on, the electromagnet (not shown) is energized and the branch conduit, throttled by the choke 25, is in communication with the atmosphere. When the electromagnet is not energized, the branch conduit 23 is connected to the air/gas mixer so as to prevent dieseling of the engine 5 upon a shutting off of such engine.

As shown in FIG. 1, a position scanner 28 is arranged at the throttle valve 15. The position scanner 28 is operable to at least indirectly sense the closing position of the throttle valve 15 and to transmit an electrical output signal indicative of the position of the throttle valve 15. A revolution counter 29 is arranged at the internal combustion engine 5 and is operable to provide an electrical output signal of the rotational speeds of the internal combustion engine 5. The output signals of the position scanner 28 and revolution counter 29 are transmitted by connections or lines 30, 31 to a logic switching circuit 32.

Figure 4:
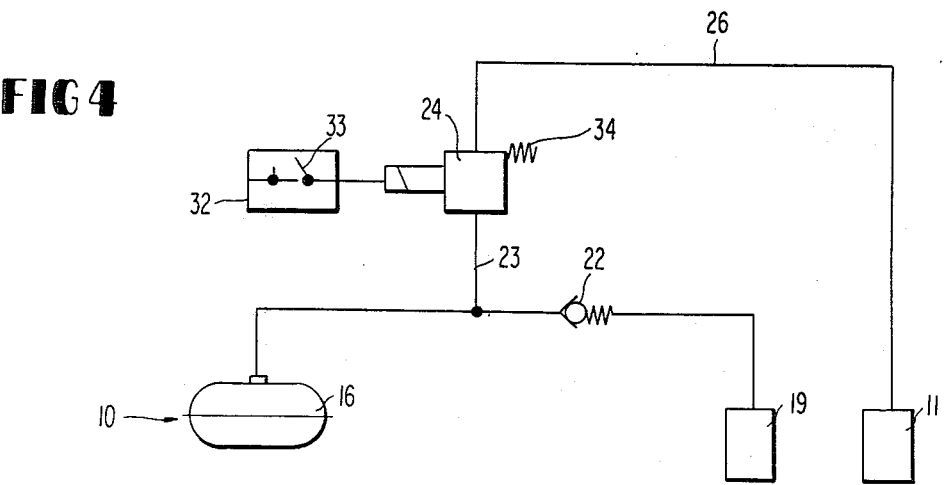
FIG. 4 is a schematic fragmentary view of the internal combustion engine of FIG. 1 illustrating the control arrangement for avoiding a backfiring of the engine during a coasting operation.

The logic switching circuit 32 includes a normally-closed switch 33 which is adapted to be opened by the logic circuit 32 in response to the position scanner 28 and/or revolution counter 29 providing output signals to the logic circuit 32 indicative that the throttle valve is in a closed position and/or the rotational speed of the internal combustion engine 5 has risen above a predetermined idling speed. The opening of the switch 33 interrupts the connection between the electromagnet of the reversing valve 24 in the ignition switch 27. Consequently, the electromagnet is non-energized in a spring 34 (FIG. 4) maintains the reversing valve 24 in a position wherein the pressure compensating connection 17 is connected by way of the branch conduit 23 and conduit 26 directly to the air/gas mixer 11. Thus, with the ignition switch 27 remaining on and the connection between the switch 27 and the electromagnet of the reversing valve 24 being interrupted, it is possible to avoid a backfiring during a coasting operation of the vehicle in which the engine 5 is disposed.

The logic circuit 32 may also be constructed so that the switch 33 is turned off even when the throttle 15 is in an open position if the revolution counter 29 detects the shaft of the engine exceeding a maximum permissable rotational speed such, for example, a rotational speed in excess of 2500 rpm thereby providing protection against an overspeeding of the internal combustion engine 5.

Figure 3:
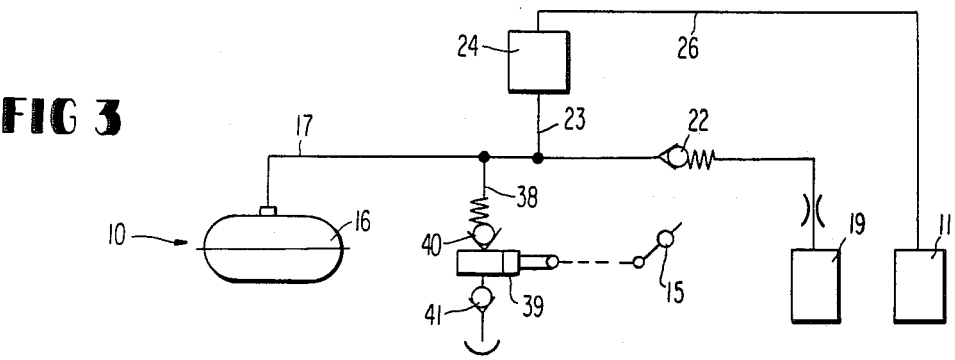
FIG. 3 is a schematic fragmentary view of the internal combustion engine of FIG. 1 illustrating the control arrangement for preventing a dieseling of the engine upon a shutting off thereof and for compensating for hesitation upon acceleration of the engine.

To compensate for any hesitation or pauses during acceleration of the internal combustion engine 5 occasioned by a depressing of an accelerator (not shown), as shown in FIG. 3, an acceleration pump 39 may be coupled to the throttle valve 15 or to an operating linkage thereof with a delivery connection or nipple 38 of the acceleration pump 39 terminating in the pressure-compensating connection 17. The acceleration pump 39 is provided with an intake valve 40 and a delivery valve 41 and the delivery connection 38 is connected to the pressure-compensating connection 17 at a position between the check valve 22 and the volume control valve 10.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A gas-operated internal combustion engine comprising an air/gas mixer means, a volume control valve means for controlling a flow of a gas stream to the air/gas mixer means, means for biasing the volume control valve means into a closed position, the volume control valve means including a diaphragm means adapted to be exposed on an operating side thereof to a vacuum ambient in the gas downstream of the volume control valve means so as to urge the diaphragm means to an opening position of the control valve means, the diaphragm means on rear side thereof being adapted to be exposed to a control pressure, the engine further including a throttle valve means disposed downstream of the air/gas mixer means and an air supply means having an air filter means disposed upstream of the air/gas mixer means, characterized in that a pressure compensating means is disposed between the rear side of the diaphragm means of the volume control valve means in a portion of the air supply means, one pressure compensating means terminates at or upstream of the air/gas mixer means, a choke means is arranged in the pressure compensating means at one of the air filter means or a housing of the air/gas mixer means, a check valve means is disposed in the pressure compensating means at a position between the choke means and the volume control means, the check valve means opens in a direction toward the choke means, a branch conduit means branches off from the pressure compensating means at a position between the check valve means and the volume control valve means, and in that a reversing valve is arranged in the branch conduit means, the reversing valve means is operable to be selectively switched to a first position enabling the branch conduit means to be opened into the atmosphere through a further choke means and a second position enabling the branch conduit means to be subjected, without impediment, to vacuum ambient in the air/gas mixer means.

2. A gas-operated internal combustion engine according to claim 1, characterized in that electromagnetic means are provided for operating the reversing valve means, an ignition switch means is provided for controlling the operation of the internal combustion engine, and in that means are provided for functionally connecting the electromagnet means in parallel with the ignition switch means such that, with the ignition switch turned on, upon an energization of the electromagnetic means, the reversing valve means is switched into the first position and, upon a de-energization of the electromagnetic means, the reversing valve means is switched into the second position.

3. A gas-operated internal combustion engine according to claim 2, characterized in that means are provided for at least indirectly scanning a position of the throttle valve means and for providing an output signal indicative of a position of the throttle valve means, means are operatively associated with an operating shaft of the internal combustion engine for sensing a rotational speed of the operating shaft and for providing an output signal of the sensed rotational speed, said means for connecting the electromagnetic means with the ignition switch means includes a normally-closed switch means arranged in a current supply line for the electromagnetic means, a logic circuit means responsive to the output signals from the scanning means and speed sensing means for controlling an opening of the normally-closed switch means upon receipt of an output signal from at least one of the scanning means and the speed sensing means.

4. A gas-operated internal combustion engine according to claim 3, characterized in that the logic circuit means is operable to open the normally-closed switch means upon receipt of an output signal from the scanning means indicating the throttle valve means is in a closed position, and an output signal from the speed sensing means indicating the rotational speed of the internal combustion engine has increased beyond a predetermined idling speed.

5. A gas-operated internal combustion engine according to claim 3, characterized in that the logic circuit means is operable to open the normally-closed switch means upon receipt of an output signal from the scanning means indicating the throttle valve means is in an open position, and an output signal from the speed sensing means indicating the rotational speed of the internal combustion engine has increased beyond a predetermined idling speed.

6. A gas-operated internal combustion engine according to one of claims 1, 2, 3, 4, or 5, characterized in that an acceleration pump means is coupled to the throttle valve means, said acceleration pump means includes a delivery connection terminating in the pressure compensating means that a position between the check valve means and the volume control valve means.

7. A gas-operated internal combustion engine according to claim 6, characterized in that the acceleration pump means includes an intake valve means and a delivery valve means.

8. A gas-operated internal combustion engine according to claim 6, characterized in that the volume control valve means forms a part of a converter means for converting the gas from a liquid into a gaseous state, the converter means includes a pressure reducing valve means and a vaporizer means disposed upstream of the valve control means, and in that means are provided for connecting the vaporizer means to a coolant system of the internal combustion engine.

9. A gas-operated internal combustion engine according to claim 8, characterized in that a pair of converter means are connected in parallel with each other.

10. A gas-operated internal combustion engine according to claim 9, characterized in that a vacuum valve means is disposed upstream of the pair of converter means for controlling a flow of liquid gas from a fuel source to the converter means, and in that means are provided for communicating the vacuum valve means with an intake manifold of the internal combustion engine.

* * * * *